United States Patent [19]

Allen et al.

[11] 3,922,613

[45] Nov. 25, 1975

[54] INFORMATION DETECTION APPARATUS HAVING AN ADAPTIVE DIGITAL TRACKING OSCILLATOR

[75] Inventors: William Reed Allen, Reading; John D. Delorenzo, Marlboro, both of Mass.

[73] Assignee: Honeywell Information Systems, Inc., Waltham, Mass.

[22] Filed: Jan. 2, 1975

[21] Appl. No.: 537,988

[52] U.S. Cl. ................ 329/104; 328/119; 328/120; 329/122; 360/27

[51] Int. Cl.² ........................ G11B 5/45; H03K 5/18

[58] Field of Search ...... 329/104, 122; 328/63, 119, 328/120; 325/346; 360/25–27

[56] References Cited

UNITED STATES PATENTS

| | | | |
|---|---|---|---|
| 3,602,828 | 8/1971 | Kurzweil et al. | 329/104 |
| 3,683,288 | 8/1972 | Curry | 329/104 |
| 3,684,967 | 8/1972 | Kelly | 328/63 |
| 3,789,379 | 2/1973 | Breikss | 360/27 |
| 3,825,844 | 7/1974 | Peterman et al. | 329/122 X |

*Primary Examiner*—Alfred L. Brody
*Attorney, Agent, or Firm*—John S. Solakian; Ronald T. Reiling

[57] ABSTRACT

Double transition recorded information, such as phase encoded or frequency encoded information, is detected by use of a digital tracking oscillator which is responsive to either the data or the clock transitions of the recorded information and which produces a string of pulses in response thereto having a frequency which changes dependent upon the frequency of occurrence of the information. Clock pulses, and accordingly, a window, are thus generated, bracketing the data substantially in accordance with predetermined criteria, thereby enabling effective detection of the data included in the information. The digital tracking oscillator is adaptive to different propagation delays and drifts which may be introduced by the various circuit elements and thus needs no further adjustment therefor and may accordingly be manufactured on a single integrated circuit chip. The oscillator is also adaptive to changes in the frequency of the reading of the recorded information. This adaptive technique thus improves upon the effective detection of the data included in the information.

10 Claims, 5 Drawing Figures

| | Q | $\bar{Q}$ |
|---|---|---|
| P=0 C=0 | 1 | 1 |
| P=1 C=0 | 0 | 1 |
| P=0 C=1 | 1 | 0 |
| P=1 C=1 | * | * |

| J | K | Q | $\bar{Q}$ |
|---|---|---|---|
| 1 | 0 | 1 | 0 |
| 0 | 1 | 0 | 1 |

INFORMATION DETECTION APPARATUS HAVING AN ADAPTIVE DIGITAL TRACKING OSCILLATOR

BACKGROUND OF THE INVENTION

Double transition recording which may include phase encoding and frequency encoding, is one of the methods of magnetically storing digital pulse information in present day recording systems. In phase encoding, the polarity of each recorded transition is representative of the digit stored in a given data cell, an additional transition being required between each pair of like digits. In frequency encoding, mandatory pulses are required at the cell boundaries. Optional pulses, selectively representative of either a binary ONE or a binary ZERO, occur in the center of the data cell.

Numerous apparatus exist in the prior art for detecting information which is recorded by the double transition technique. One such prior art device utilizes a circuit for generating a constant phase reference signal synchronized at the same frequency as the signal waveform representing the data. Data and reference signals are combined to produce a signal for sampling the significant transitions over the entire nominal bit period. Another such prior art device utilizes a scheme in which a fixed time period is established for sampling for the presence of a particular transition, wherein a ramp generator may be utilized to determine the time period. Another known prior art technique utilizes a frequency tracking phase lock oscillator during readout. Continually synchronized by the readout pulses, this so-called fly wheel oscillator is used as a timing reference in lieu of the readout pulses themselves which are subject to instantaneous timing fluctuations. These and other techniques may be seen for example in U.S. Pat. Nos. 3,518,554 and 3,652,943.

These prior art techniques deal with the problems for example of either pulse crowding thereby causing phase shifts of the recorded pulses so as to make discrimination between the data bits difficult and/or the problem of readout due to timing variations, for example, due to velocity fluctuation of the recording medium. The recording medium which may be for example a magnetic tape device or a magnetic disc device, may have its data recorded thereon at one extreme speed within given specifications and may have such information read from the device at another extreme speed, but still within the given specifications of the device. Such velocity fluctuation in the recording medium may be for example caused by a varying load on the driving motor of the recording medium or based upon the use of such recorded information on a different recording medium which may operate at a different velocity. This causes a phase shift of the information readout and thereby, unless compensated for, may in some cases, make effective readout of such information impossible.

It is accordingly a primary object of the present invention to provide an improved technique for detecting double transition recorded information which is adaptive to variations in signal propagation and needs no adjustment therefor.

SUMMARY OF THE INVENTION

The purposes and objects of the invention are satisfied by providing apparatus for detecting such information which includes means for generating a first signal in response to each occurrence of the information, frequency control means for generating a second signal, and variable frequency oscillator means responsive to the first signal and to the second signal for generating a plurality of third signals having a frequency which is determined by the value of the second signals. Means are also provided for sensing the frequency relationship between the occurrence of such information and the frequency of the third signal and in response thereto there is provided means for changing the value of the second signal so that the frequency of the third signal corresponds to a predetermined function of the frequency of the occurrence of the information thereby enabling decoder means which is coupled to receive the third signals to generate a fourth signal bracketing the data included in such information so as to enable reliable detection thereof. The apparatus of the present invention provides an improvement to the invention of United States application Ser. No. 430,113, filed on Jan. 2, 1974, and assigned to the same assignee of this application, by providing a digital tracking oscillator which is adaptive to changes in the rate of reading recorded information and which is adaptive to propagation delays and drift of various circuit elements, with no need of adjustment therefor and which may be manufactured on a single integrated circuit chip.

BRIEF DESCRIPTION OF THE DRAWINGS

The advantages of the foregoing configuration of the present invention will become more apparent upon reading the accompanying detailed description in conjunction with the figures in which.

DETAILED DESCRIPTION OF THE PREFERRED EMBODIMENTS

Figures 1, 4, 5:
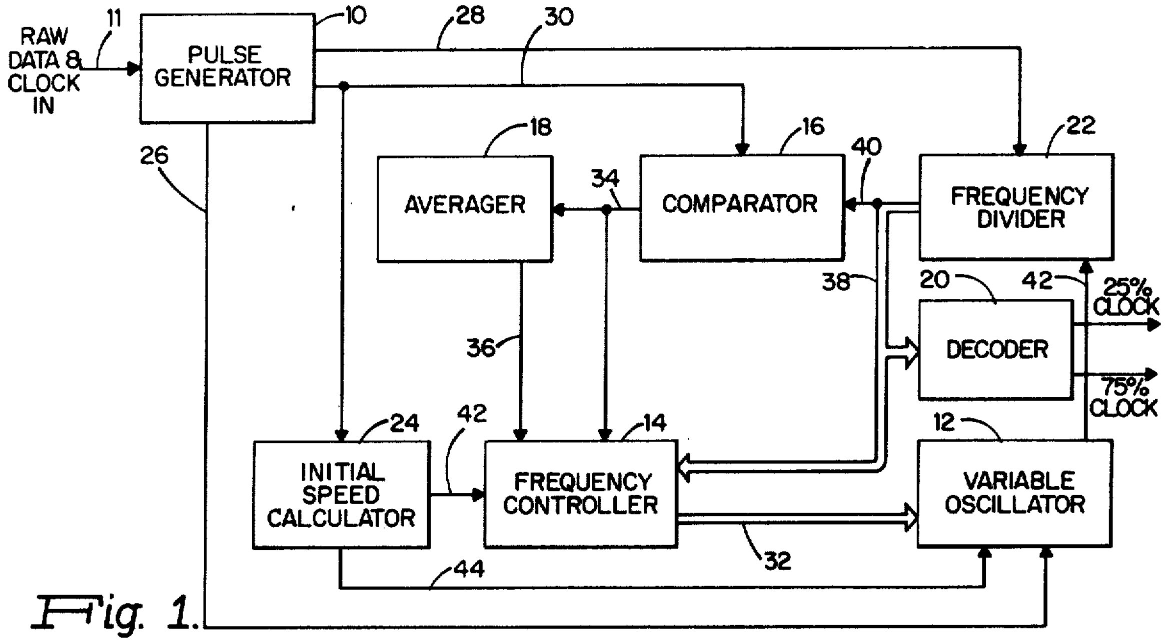
FIG. 1 is a general block diagram of the apparatus of the present invention.
FIG. 4 is a truth table illustrating the operation of one of the elements included in the pulse generator of FIGS. 1 and 2.
FIG. 5 is a truth table illustrating the operation of one of the elements included in the comparator of FIGS. 1 and 2.

Referring to FIG. 1, there is shown a general block diagram of the apparatus of the present invention. The basic purpose is to convert the data and clock input information into two clocks bracketing the data transitions. These two clocks are referred to as the 25 percent clock and the 75 percent clock at the outputs of decoder 20. The 25 percent clock will occur approximately 25 percent after a data transition at the input on line 11 and the 75 percent clock will occur 75 percent after a data transition which is 25 percent before the next data transition received on line 11. The data will read between the 75 percent and 25 percent clocks which is generally referred to as a window and which percentages with respect to time may be opened or closed thereby enlarging or decreasing the size of the window as desired.

The primary elements of the apparatus of the present invention include a pulse generator 10, variable oscillator 12, comparator 16, averager 18, decoder 20, a so-called frequency divider 22 and an initial speed calculator 24. The pulse generator 10 is coupled to receive the raw data and clock input on line 11 of either the phase encoded or frequency encoded information, and functions to provide pulses of given durations based upon either the positive or negative going transitions of the incoming information on line 11. One of such pulses functions to effectively disable the variable oscillator 12 from generating pulses. The variable oscillator 12 includes variable delays in its feedback whereby a change in the amount of delay causes a corresponding change in the frequency of the oscillator pulses generated thereby. The frequency of the oscillator 12 is governed by the value received from frequency controller 14 over line 32. Frequency controller 14 includes a storage counter, the value of which is coupled to select the delay in oscillator 12 and thereby control the frequency of pulses in oscillator 12. Initially, the frequency controller 14 as well as the frequency divider 22 are preset at predetermined or center values so as to enable the variable oscillator 12 to run at a nominal frequency. Initial speed calculator 24 is then utilized to set variable oscillator 12 via frequency divider 22 to generate pulses with a frequency proportional to the rate at which an initial plurality of transitions is received by pulse generator 10. Once the initial adjustment is made via the initial speed calculator 24 to the variable oscillator 12, the calculator is in effect not used, and further as shall be seen, the value established in the frequency divider 22 is no longer required to preset frequency controller 14. Instead, the comparator 16 compares the most significant bit on line 40 of the output of the frequency divider 22 with the pulse received on line 30 from pulse generator 10 as a result of a transition received on line 11. If the transition received on line 11 occurs before the most significant bit of the frequency divider 22 is reset, then the apparatus of the present invention as represented by the pulses generated by oscillator 12 is running slower than the transitions received on line 11. This fact is stored in the averager 18. If more than a predetermined number of transitions have occurred in any one direction thereby indicating that the apparatus of the present invention is running slower or faster than the transitions received on line 11, the averager 18 causes the frequency controller 14 to make an increment or decrement in the proper direction in order to change the frequency of the oscillator 12 pulses on line 42 so as to be as close to the speed or rate of the incoming transitions on line 11 as the system allows. Thus averager 18 operates to compensate for tape or disc speed variation and averages out the effects of pulse peak shifting. The decoder 20 is coupled to receive the value on bus 38 and detects predetermined values thereof to generate the 25 and 75 percent clock pulses, which are then used to generate a window bracketing the data transitions received on line 11 so as to enable proper detection thereof by means of for example a data processor coupled therewith.

It can thus be seen that once the 25 percent and 75 percent clock pulses are in substantial synchronization with the rate of the incoming trnsitions on line 11 and accordingly the recording media speed. Thus an anticipated data bit may fall anywhere between such clock pulses thereby enabling the required detection. It can also be seen that by the comparator, averager, and frequency controller elements of the present invention that as the tape speed varies, the distance, i.e., time between the clock pulses will vary respectively, thereby allowing the apparatus to constantly center such data transitions within the window generated by such clock pulses.

More specifically, and still referring to FIG. 1, after the initial setup of oscillator 12 by means of controller 14, initial speed calculator 24, the receipt of a transition on line 11 causes the pulse generator 10 to generate pulses on lines 26, 28 and 30. Line 26 is coupled in order to enable oscillator 12 whereas line 28 is coupled to enable the setting of the initial conditions of frequency divider 22. Line 30 is coupled also to set the initial conditions of initial speed calculator 24 as well as to provide one input to comparator 16. As previously indicated, oscillator 12 is coupled via lines 32 to generate pulses on line 42 at a frequency dependent on the value on line 32. Oscillator 12 is coupled to change or increment the value of the count in divider 22 for each pulse occurring on line 42. Decoder 20 is coupled to divider 22 in order to decode the value contained therein and in order to thus produce the 25 percent and 75 percent clock pulses. At the same time, and as shall be seen the most significant bit received from divider 22 on line 40 of bus 38, is compared with the pulse received on line 30 from pulse generator 10 by means of comparator 16 in order to determine the phase relationship of the transition received on line 11 and the last compared frequency, as indicated by the most significant bit received on line 40 from divider 22.

In response to comparator 16 averager 18 is coupled to be either incremented or decremented depending upon the phase relationship determined by comparator 16. These comparisons are repeated for each such transition received on line 11, until a predetermined number of phase changes in one direction after subtracting the phase changes of changes in the other direction have been detected by means of averager 18 at which time the value in frequency controller 14 is updated via signals on lines 36 and 34 in order to keep the 25 percent and 75 percent clock pulses and therefore the window bracketing such data transitions in a centered position with respect thereto.

Now referring to the detailed diagram of FIG. 2, together with the timing diagram of FIG. 3, the apparatus of the present invention will be discussed in further detail. The frequency encoded or phase encoded information is received on line 11 and by means of pulse generator 10, further pulses are generated on lines 26, 28 and 30. For ease of discussion and due to the basic similarities in the phase encoded and frequency encoded type recorded information, the following discussion, although generally applicable to both types of recorded information, will be primarily based on phase encoded information. The phase encoded information on line 11 is converted into pulses by means of generator 50 so that the positive and negative going transitions seen on line 11 appear as positive going pulses at the respective inputs of OR gate 52 which are then received by flipflop 54 on line 30 as waveform A. Waveform A is shown in FIG. 3. The first pulse represents a data transition and the last pulse also represents a data transition. The middle clock pulse shown by dotted lines represents a possible phase transition. Waveforms B through H are based upon the non-occurrence of such phase transitions whereas waveforms D' through H' reflect the occurrence of such phase transition.

The transition to pulse generator 50 may include two one-shot multivibrators, one of which may be coupled to provide a pulse in response to a positive going transition and the other responsive to produce a pulse in response to a negative going transition. These pulses produced by generator 50 as indicated hereinbefore are coupled via OR gate 52 in order to set flip-flop 54.

Flip-flop 54, when set, provides at its $\overline{Q}$ output, as indicated by waveform B, a logical zero state which returns to the logical one state when flip-flop 54 is reset. The period of time that the $\overline{Q}$ output is in the logical zero state is referred to as interval T and is adaptive to the actual loop time of oscillator 12. Flip-flop 54 is reset when oscillator 12 is clear of pulses. This condition is indicated by detector 53 which is coupled in the loop of oscillator 12 preferably with delay 60. Multiple output taps, preferably spaced equidistantly, from delay 60 are coupled in order to insure detection of a pulse in delay 60. Detector 53, which may be simply a plurality of NOR gates, generates a pulse to reset flip-flop 54 if neither of the detector 53 input receives a pulse from delay 60, i.e. when delay 60 is clear of pulses. This coupling with delay 60 is appropriate when the delay time of delay 60 is greater than the delay time of delay 62 and the other elements in oscillator 12 and particularly if the oscillator 12 loop is broken between delay 60 and delay 62 as discussed hereinafter. Otherwise, the detection of a pulse in the oscillator 12 loop may be made by further connection such as with the delay 62 and/or at the $\overline{Q}$ output of flip-flop 58. By this adaptive technique, variations in the propagation delay of various circuit elements such as flip-flop 58 as well as any drift in such propagation characteristics, are adapted to, thereby better centering the time during which data is strobed or detected. Thus, rather than providing an interval T by use of a one shot multivibrator, which interval T would have to be a tolerance longer than the loop time of oscillator 12, only that period of time required to clear the oscillator 12 of pulses is needed regardless of the characteristics, i.e. a propagation time, of such oscillator elements. Further, since a one shot multivibrator is not used to establish the interval T, no adjustment nor need for selecting critically valued components are needed and the oscillator may be thus manufactured on a single integrated circuit chip.

Waveform C is coupled to enable the loading of binary counter 56 as shall hereinafter be described, and waveform B is coupled to the preset input of flip-flop 58. Flip-flop 58 may be that type sold by Texas Instruments, Inc., as Part No. SN7474. The truth table illustrating the operation of flip-flop 58 is shown in FIG. 4. As shown in FIG. 4, when the preset and clear inputs of flip-flop 58 are both binary zeroes, then both the Q and $\overline{Q}$ outputs are both binary ones. At the other extreme, when both the preset and clear inputs are both binary ones, then as indicated by the asterisks in FIG. 4, the binary values of the Q and $\overline{Q}$ outputs depend upon the toggle or clock and D inputs or the last condition in the absence of the clock inputs of flip-flop 58. It is also noted that if either the preset or clear inputs are a binary zero, that this condition overrides any operation that the clock or toggle input may otherwise produce. Also shown in variable oscillator 12 are two delays 60 and 62 as well as a one of N selector 64. The inverter 66 is included in order to provide proper polarity between the flip-flop 58 and selector 64. Selector 64 may also be of type manufactured by the above-mentioned firm as Part. No. SN74151. Selector 64 when enabled operates to provide a pulse on line 68 from one of the lines one through N as received from delay 62 dependent upon the value received at its select input on line 32. The input to delay 60 is received via inverter 66 from the Q output of flip-flop 58 and after a small delay produces such signal at the clear input of flip-flop 58. After a longer delay, the pulse received at the input of delay 60 is received by delay 62. The outputs from delay 62 are preferably equidistant in time so as to for example produce a delay of 10 nanoseconds on line 2, and to produce the delay of N times 10 nanoseconds on the Nth line. One of these delayed signal lines at the output of delay 62 is coupled through selector 64 onto line 68 dependent on the value indicated hereinbefore on line 32 coupled from frequency controller 14. As shall be seen, this combination acts to produce variable frequency pulses in oscillator 12 as represented by waveform D on line 42 so as to compensate for such velocity variations.

In addition, referring to FIG. 4, in response to waveform B on line 26, and assuming that both the preset and clear inputs of flip-flop 58 are initially binary ones, and that the Q and $\overline{Q}$ outputs are respectively a binary zero and a binary one, a binary zero signal level for waveform B causes the $\overline{Q}$ output to go to a binary one and the Q output to go to a binary zero. The binary one at the Q output of flip-flop 58 is converted to a binary zero by means of inverter 66 which after a small delay through part of delay 60 and by means of line 61, causes flip-flop 58 to receive a binary zero on the clear input such that both the Q and $\overline{Q}$ outputs are binary ones. Once the waveform B on line 26 goes to the binary one state, and with the binary one on the preset input and the binary zero on the clear input of flip-flop 58, the Q and $\overline{Q}$ outputs are respectively a binary zero and a binary one. The binary zero on the Q output of flip-flop 58 is inverted to a binary one state and is coupled to the input of delay 62 by means of the other output of delay 60. Delay 62 has preferably N outputs as hereinbefore described and is operative via selector 64 to select one input for transmission on line 68. This selection occurs by means of the value on line 32 such that the delay in the loop of oscillator 12 and accordingly the frequency of oscillator 12 may be varied. That is, if the value of line 32 causes the second line on delay 62 to be selected for application to the toggle input of flip-flop 58, then the oscillator frequency will have one value, whereas if the selection causes the Nth output of delay 62 to be coupled into line 68, the oscillator frequency will have another value. The oscillator 12 pulses are reflected in waveform D as shown in FIG. 3. Once a pulse appears on line 68, and if both the preset and clear inputs are binary ones, this will cause a binary one represented by the +V input to input D of flip-flop 58 to be placed at the Q output of flip-flop 58. This process repeats until another transition and therefore binary zero state is seen on line 26 as waveform B.

In summary, the operation of oscillator 12 is such that during the time waveform B on line 26 is a binary zero, the oscillator 12 is inoperative to produce pulses as indicated by waveform D in FIG. 3. It should also be noted that the period T for the binary zero state of waveform B on line 26 should be equal to or preferably somewhat greater than the total loop time in the oscillator 12 and this is accomplished in an adaptive manner as discussed hereinbefore by the feedback via detector 53 which acts to reset flip-flop 54. The loop time may be represented basically as the amount of time provided by delays 60 and 62. It should be understood that delays 60 and 62 may be delay lines or may be for example logic elements such as OR gates which have an inherent delay and outputs coupled in order to provide the timing selection desired. Further, the delays are picked for the actual frequency of recorded information but the adaptive scheme of this invention allows adaptive response to frequency variations when reading such information. Thus, oscillator 12, after waveform B goes to the binary one state, operates to provide a plurality of pulses on line 42 as waveform D which increments the binary counter 56 in the so-called frequency divider 22.

The selector 64 in oscillator 12 receives its value on line 32 from storage counter 70 included in frequency controller 14. Storage counter 70 has a load input coupled with initial speed calculator 24, a clock input coupled to averager 18, an up-down input coupled to comparator 16 as well as a data input coupled to frequency divider 22. The load input is used during initial conditions such that the value included in binary counter 56 of frequency divider 22 is placed in storage counter 70 as shall hereinafter be discussed. Such value is that produced by calculator 24 between the 8th and 9th transitions initially received on line 11. The clock input 70 operates whenever there is an overflow or underflow condition generated by averager 18 which then enables the up-down input of counter 70 to either increment or decrement, that is, change the value up or down of the counter 70, by means of line 34 coupled to the $\overline{Q}$ output of flip-flop 72 in comparator 16.

Frequency divider 22 includes a binary counter 56 which has a load M input, an increment input, and a load enable input. The load input is enabled when the negative going transition of waveform C on line 28 is generated. This causes the value M to be loaded into binary counter 56. The value M may be selected to be for example the number 8 which value is selected to operate in accordance with the nominal frequency of oscillator 12. Thus, each time a transition is received, binary counter 56 is loaded with the value M. Also, each time a negative going pulse appears on the $\overline{Q}$ output of flip-flop 58 of oscillator 12 as waveform D on line 42, binary counter 56 is incremented and accordingly the value in counter 56 is represented in FIG. 3 as value E also appearing on bus 38 of FIG. 2. The most significant bit on bus 38 as represented by line 40 is coupled to the J and K inputs of flip-flop 72 of comparator 16. The value of bus 38 is coupled to the 25 percent and 75 percent decoders 74 and 76 respectively included in decoder 20 to provide the 25 percent and 75 percent clock shown as waveforms F and G in FIG. 3. These pulses then may be combined by a flip-flop 78 to set and reset such flip-flop 78 to produce the window signal as shown by waveform H. The window signal causes the data transition to be strobed to a utilizing device such as a data processor via AND gate 80.

The comparator 16 may comprise simply a flip-flop 72 and an inverter 73. Flip-flop 72 may be a JK type flip-flop which may also be purchased from the above-mentioned company as Part No. SN74H106. The truth table for the flip-flop is depicted in FIG. 5. Flip-flop 72 receives as its toggle input waveform A on line 30. The K input is coupled to the most significant bit (MSB) data line 40 and the J input of flip-flop 72 is also coupled to receive line 40 via inverter 73. The flip-flop 72, in response to a pulse at the T input, operates to transfer the binary value on the J and K inputs to the Q and $\overline{Q}$ outputs in accordance with FIG. 5 in response to a binary one state received on line 30 at the toggle input of flip-flop 72 necessarily means the J input receives a binary zero via inverter 73 and represents that the most significant bit on line 40 is thus a binary. Accordingly, when a pulse is received at the toggle input when the value of line 40 (MSB) is a binary one, then the frequency of oscillator 12 is faster or greater than the frequency of transitions on line 11. On the other hand, if the K and J inputs are binary zero and binary one respectively, when a pulse is received on line 30 in response to a transition, then the frequency of oscillator 12 is less or slower than the frequency of the transitions received on line 11. The flip-flop 72 accordingly produces an output on line 34 to increment (when the oscillator is running slower) or decrement (when the oscillator is running faster) counter 80 included in averager 18 and storage counter 70 included in frequency controller 14. Accordingly, when the frequency of oscillator 12 is effectively less than the frequency of the transitions received on line 11, counters 80 and 70 will be incremented and will be decremented when the frequency of oscillator 12 is greater than the frequency of transitions on line 11. It should again be noted that unlike counter 80 which is incremented or decremented in response to changing conditions of the $\overline{Q}$ output of flip-flop 72, storage counter 70 included in controller 14 will not be so incremented or decremented until a clock signal is received from averager 18 on line 36 in response to an overflow or underflow condition.

As indicated hereinbefore, averager 18 includes an updown counter 80 which is coupled to be incremented or decremented by means of comparator 16 dependent upon the difference between the oscillator 12 frequency and the frequency of transitions as represented by waveform A and as received on line 11. Dependent upon system requirements, the up-down counter will produce an overflow or underflow condition when a predetermined plurality of increments over decrements or vice versa have been experienced by counter 80. An overflow or underflow signal in addition to enabling the loading of the value X into counter 80, also provides a clock pulse to counter 70 thereby allowing counter 70 to be either incremented or decremented in accordance with the information on line 34. The value X may be any value in accordance with the desired synchronization between the clock pulse (waveforms F and G) and data transitions of the system and may be for example the number 8. Accordingly, after a plurality of increments and/or decrements to counter 80, wherein the number of increments exceeds the number of decrements by 8, the counter which may be a 16 bit counter that is, a four stage counter, is automatically reset to all binary zeros such that an overflow condition is indicated and in response to a surplus of 8 decrements, the counter 80 resets such that the value in the counter is all binary zeros thereby indicating an underflow condition. A signal is thus generated to provide the clock to counter 70. Essentially at the same time thus an overflow or underflow condition is generated by means of counter 80 and actually just prior thereto, since the overflow or underflow condition is generated in response to the operation of flip-flop 72 in comparator 16, the signal indicating the incrementing or decrementing thereby producing the overflow or underflow is received by counter 70 thereby designating that counter 70 is accordingly incremented or decremented by one.

Initial speed calculator 24 also includes a binary counter 90 which is cleared upon initial conditions and which operates to enable selector 60 in oscillator 12 upon receipt of the eighth transition on line 30 and which also operates to load into storage counter 70 of frequency controller 14 the frequency as indicated by counter 56 as indicated between the eighth and ninth transitions first received on line 30 via line 16. Thus, binary counter 90 in initial speed calculator 24 is first cleared. This condition enables AND gate 92 to pass each transition on line 30 in order to increment binary counter 90. When the binary counter 90 indicates a count of 8, selector 64 is enabled. When the memory counter indicates a count of 9 via the 1 and 8 enabling inputs to AND gate 94, counter 70 is loaded with the contents of counter 56 which counters correspond to the frequency indicated by the time between the eighth and ninth transitions. The reason that the first eight transitions received on line 11 are not utilized in the system is because of the fact that the recorded information in the storage device which may be for example a disc or tape mechanism, is subject to pulse crowding and therefore pulse shifting and accordingly the frequency between such pulses or transitions does not represent the normal distance between pulses, i.e. frequency; of the device. Accordingly, and by way of illustration, after eight such transitions, the value of the frequency of oscillator 12 is provided to counter 56 and is stored in counter 70. It should be understood that the value M which is initially loaded into counter 56 may also be the same as the eventual frequency which is initially loaded from counter 56 into counter 70.

Figure 2:
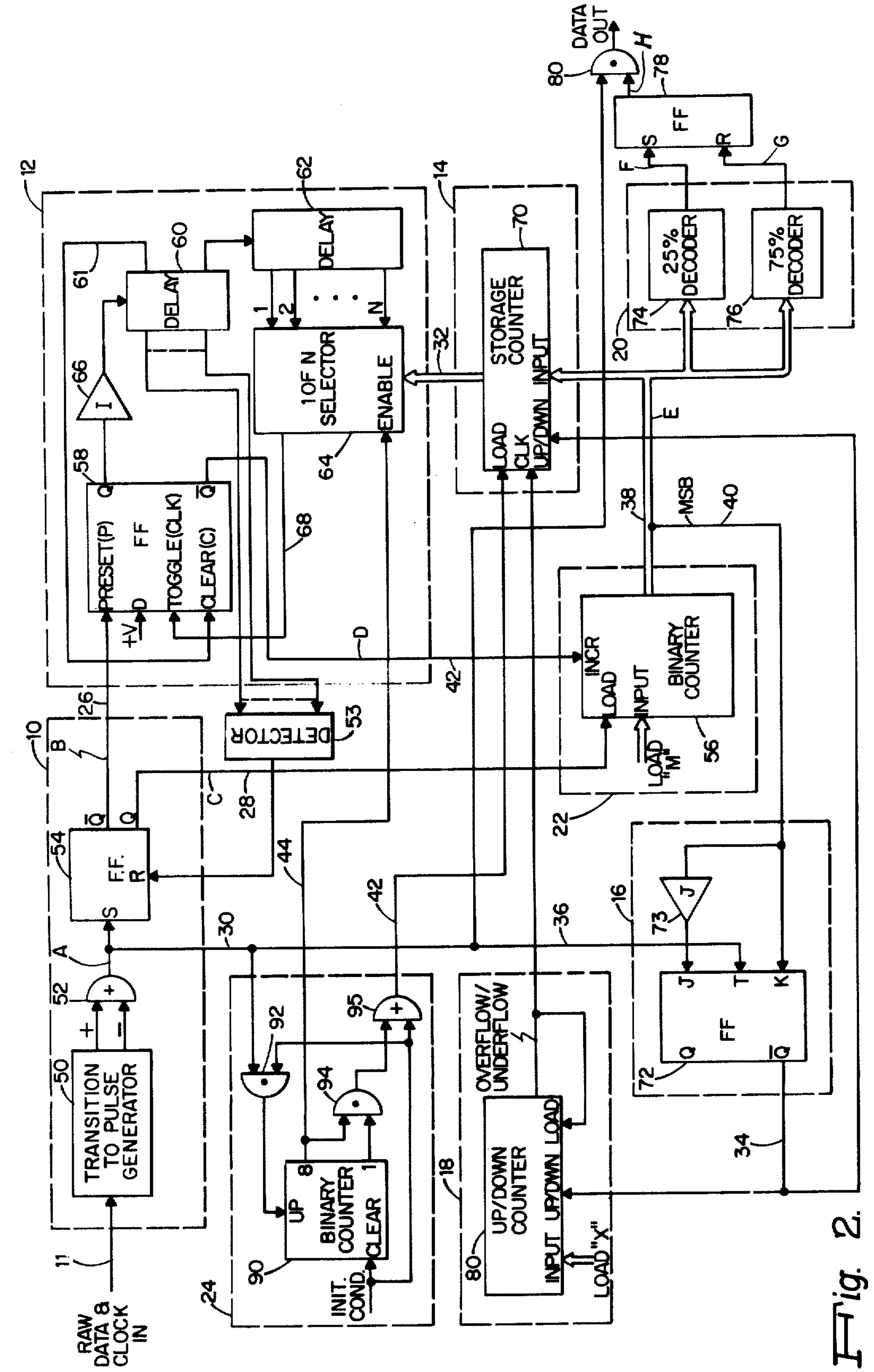
FIG. 2 is a detailed block diagram of the apparatus of the present invention.
Figure 3:
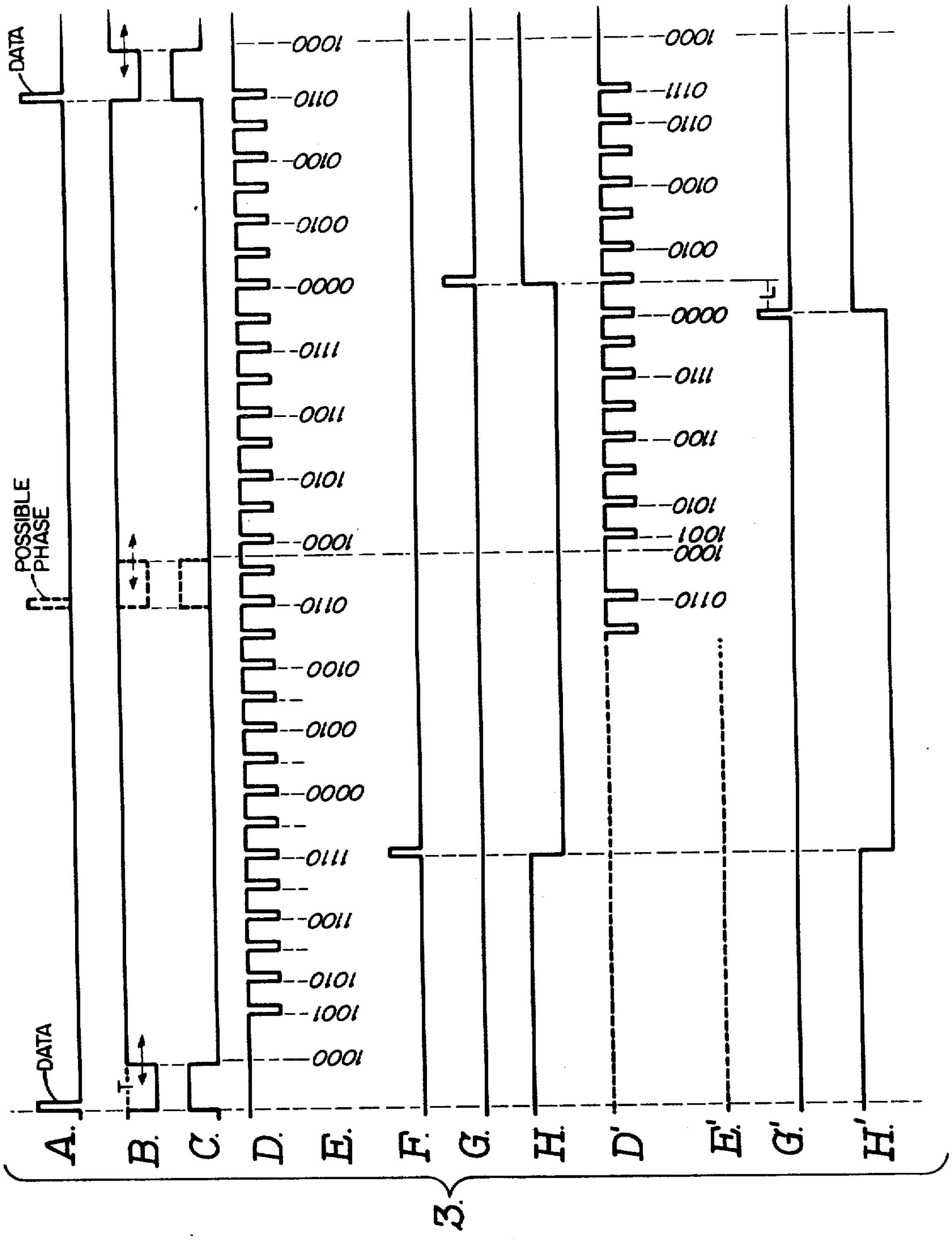
FIG. 3 is a timing diagram illustrating the operation of the apparatus of FIG. 2.

Thus in operation, and referring to the logic diagram of FIG. 2 and the timing diagram of FIG. 3, assuming that there is not a possible phase pulse as indicated in the middle of waveform A by dotted lines, upon receipt of the data transition on line 11 is represented by waveform A at the output of gate 52, flip-flop 54 will produce a waveform B having a period T which, as explained hereinbefore, is adaptive to the feedback from oscillator 12. Waveform B in addition to enabling counter 56 to be loaded with the value M, also enables oscillator 12 to produce the pulses as shown by waveform D. The frequency of these pulses is determined by the value on line 32 received by selector 64, which initially is computed by means of the initial speed calculator 24 between the eighth and ninth transitions initially received by the apparatus of the invention. The pulses of waveform D on line 42 are coupled to increment binary counter 56 and thereby produce the values on bus 38 as indicated by the values E in FIG. 3. In response to the signal on bus 38, decoder 20 acts to generate the 25 and 75 percent clocks as indicated by waveforms F and G respectively. These respective clocks may be used to set and reset flip-flop 78 so as to generate a window starting with the 75 percent clock and ending with the 25 percent clock generated by the next data transition. Thus, the window as indicated by waveform H occurs when waveform H is a binary one value. The window signal is then utilized to strobe the data via AND gate 80 to a utilizing device.

The value on line 32 determined by storage counter 70 is maintained at the same value until an overflow or underflow condition is generated by means of counter 80 is averager 18. Counter 80 generates such overflow or underflow conditions if the frequency of transitions as shown by waveform A is respectively greater or less than the frequency of the pulses generated by oscillator 12 as represented by the pulses of waveform D. This difference in frequency is detected by means of comparator 16 and utilizes the most significant bit of counter 56 together with the transitions as represented by waveform A to generate an output to either increment or decrement counter 80. After the number of increments is greater than the number of decrements by a predetermined number or after the number of decrements is greater than the number of increments by a predetermined number, an overflow or underflow condition will be generated on line 36 so as to update storage counter 70. Counter 70 is updated in the same manner as counter 80 was incremented or decremented to produce such overflow or underflow condition. That is, the same pulse from flip-flop 72 which caused a signal on line 36 to provide a clock signal to counter 70 is also used in combination with such clock signal to change the value generated via counter 70 on line 32. The predetermined number before a clock signal is generated and may be any number in accordance with the optimum operation of the system and may be for example the value of eight. Upon generation of such overflow or underflow condition, the counter 80 is again loaded with the value X which in this case may be the value also of eight when counter 80 is a four stage counter, having 16 different count states. Thus in this manner, the frequency of operation of oscillator 12 and accordingly the time at which the window appears for strobing the data to a utilizing device is optimized to be as close as possible to the incoming frequency of transition on line 11. It is also noted that each time a transition is received, that the pulse represented by waveform B on line 26 is utilized by oscillator 12 to open the loop of oscillator 12 and thereby eliminate resynchronization problems since in fact the frequency of oscillator 12 in its operation is started each time that a transition is received. Thus, for the same value on line 32, the window as represented by waveform H starts at the same point each time. This is true where there is no phase pulse between the data transitions. The adaptive nature of the oscillator provides further optimization with respect to the centering of the strobe window.

If there is a phase transition, and there always will be a phase transition for frequency encoding, as shown by the dotted line possible phase pulse of waveform A, then pulses will also be generated at the $\overline{Q}$ output of flip-flop 54, as shown in waveform B by dotted lines, and at the Q output of flip-flop 54 as shown in waveform C by dotted lines. In response to this phase pulse, the operation of the apparatus of the present invention is shown in FIG. 3 by waveforms D', E', G' and H'. Waveform D' and the value as indicated by E' are the same as was the case for waveform D and the value of E of FIG. 3, except upon the occurrence of a possible phase transition, the pulse of waveform D' are inhibited during the time T of waveform B and further, the value as shown by E' is resynchronized so that at the time of the negative going transition C, the value in counter 56 of frequency divider 22 is loaded with the value M which in this case is the value eight. Thus, the pulses are resynchronized as is the case when any data transition occurs. Accordingly however, there is a shift to be seen in the values between E' and E. This generates a shift in the 75 percent clock as represented by waveform G'. This represents a slight error because of the displacement error between the 75 percent clock of waveforms G and G'. This error corresponds to the frequency of oscillator 12 and may be minimized but more importantly such error is resynchronized, and is not cumulative due to the fact that each data transition produces its own or that is, starts its own string of pulses as generated by oscillator 12 and as represented by the pulses of waveform D or D′. The error L may be minimized by not only reducing the loop time of oscillator 12 but also by breaking such loop at at least one point so as to result in a shorter period of time required at the output of flip-flop 54 as represented by waveform B. When the time T of waveform B is further minimized, likewise the error L is minimized. The loop may be broken for example between delays 60 and 62. In this manner, the loop is cleared of pulses much faster. If the delay produced by delay 60 is equivalent to the average delay produced by delay 62, and if there are no other delays in the loop, in fact the error L may be reduced by one-half. Logic wise, what may be inserted between delay 60 and delay 62 may be at least one AND gate which is disabled when waveform B goes to a binary zero, thereby clearing each portion of the loop independently. It should also be obvious that other changes may be made to the invention without departing from the spirit and scope of the invention as herein set forth.

Having described the invention, what is claimed as new and novel and for which it is desired to secure Letters Patent is:

1. Information detection apparatus comprising:
A. means for receiving a plurality of first signals representative of said information;
B. control means for providing a second signal;
C. oscillator means, responsive to said second signal, for generating a plurality of third signals having a frequency determined by the value of said second signal;
D. means for detecting the generation of said third signals by said oscillator means;
E. bistable means, responsive to each of said first signals, for disabling said oscillator means;
F. means, coupled with said bistable means and responsive to an indication from said means for detecting that said oscillator means is no longer generating said third signals, for reenabling said oscillator means to generate said third signals; and
G. means, responsive to said third signals generated between the time said bistable means is disabled and the time said bistable means is reenabled, for generating a fourth signal and a fifth signal between which one of said plurality of first signals may be detected.

2. Apparatus as in claim 1 wherein said oscillator means comprises delay means having a plurality of outputs for providing different predetermined delay times, one of which outputs is selected for providing said third signals in response to said second signal; and wherein said means for detecting is coupled with said delay means for detecting the absence of any signals in said delay means so that in response thereto, said means for reenabling may reenable the generation of said third signals by said oscillator means.

3. Apparatus as in claim 2 wherein said means for generating comprises decoder means responsive to said fourth and fifth signals for generating a strobe signal substantially centered on one of said first signals.

4. Apparatus as in claim 1 wherein said oscillator means comprises:
A. switch means responsive to said first signal;
B. selector means, having a plurality of inputs and an output, and responsive to said second signal for coupling one of said plurality of inputs to said output;
C. delay means coupled between one output of said switch means and having a plurality of outputs coupled to respective ones of said inputs of said selector means, said outputs of said delay means provided to produce predetermined delay times; wherein
D. said output of said selector means is coupled with said switch means to generate said third signals in response to said first signal at a frequency determined by the delay time associated with the coupled one of said selector means inputs to said selector means output.

5. Apparatus as in claim 4 further comprising means for coupling said means for detecting with said delay means in order to indicate the absence of any signals in said delay means after said oscillator means has been disabled.

6. Apparatus as in claim 1 further comprising:
A. comparator means for determining the frequency relationship between said plurality of first signals and said plurality of third signals; and
B. means, including said control means and responsive to said comparator means, for changing the value of said second signal and thereby change the value of the frequency of said plurality of third signals to more closely correspond to a predetermined fraction of the frequency of said plurality of first signals.

7. Apparatus as in claim 6 further comprising averager means, coupled with said comparator means and said means for changing, for changing the value of said second signal only after the occurrence of a predetermined relationship between said frequency of said plurality of third signals and said predetermined fraction of the frequency of said plurality of first signals.

8. Apparatus for detecting information comprising:
A. means for receiving a first signal in response to each occurrence of said information;
B. frequency control means for generating a second signal;
C. variable frequency oscillator means, responsive to said first signal and said second signal, for generating a plurality of third signals having a frequency determined by the value of said second signal;
D. means for sensing the frequency relationship between a representative value of the frequency of occurrence of said information and the frequency of said third signals;
E. means, responsive to said means for sensing, for averaging said frequency relationship, said means for averaging operative to provide a fourth signal when said frequency of said third signals is greater or less than said representative value a given number of times more than said last-mentioned frequency is respectively less or greater than said representative value;
F. means, responsive to said fourth signal, for changing the value of said second signal so that the frequency of said third signals more closely corresponds to said representative value of the frequency of occurrence of said information;
G. decoder means, coupled to receive said third signals, for generating a fifth signal, during which fifth signal said information may be detected; and wherein the improvement comprises:
H. means for detecting the generation of said third signals by said oscillator means;

I. switch means for disabling said oscillator means from generating said third signals, each time a one of said first signals is received; and J. means, coupled with said switch means and responsive to an indication from said means for detecting that said oscillator means is no longer generating said third signals, for reenabling the generation of said third signals by said oscillator means.

9. Apparatus as in claim 8 wherein said oscillator means comprises delay means having a plurality of outputs for providing different predetermined delay times, one of which outputs is selected for providing said third signals in response to said second signal; and wherein said means for detecting is coupled with said delay means for detecting the absence of signals in said delay means so that in response thereto, said means for reenabling may reenable the generation of said third signals by said oscillator means.

10. Apparatus as in claim 8 wherein said oscillator means includes delay means coupled to provide said third signals at the selected frequency and wherein said delay means includes signals flowing therethrough, even after said oscillator means is disabled, for a period of time proportioned to the frequency of said third signals; and wherein said period of time is minimized by said detection of the lack of said third signals generated by said oscillator means and the reenabling of said oscillator means in response to such detection; whereby said fifth signal is generated at a time which improves the ability of said apparatus to detect said information.

* * * * *